United States Patent
Moreland

(10) Patent No.: US 6,651,938 B1
(45) Date of Patent: Nov. 25, 2003

(54) CLIP FOR TRACK SYSTEMS

(76) Inventor: Karren Moreland, 1102 E. Country Gables, Phoenix, AZ (US) 85022

( * ) Notice: Subject to any disclaimer, the term of this patent is extended or adjusted under 35 U.S.C. 154(b) by 0 days.

(21) Appl. No.: 10/255,467

(22) Filed: Sep. 26, 2002

(51) Int. Cl.[7] ............................................. F16L 3/00
(52) U.S. Cl. ............................................. 248/61; 16/940
(58) Field of Search .......................... 248/61, 58, 317, 248/307; 362/396, 806, 252, 122; 16/87.4 R, 94 D; 211/123

(56) References Cited

U.S. PATENT DOCUMENTS

| | | | | | |
|---|---|---|---|---|---|
| 699,971 | A | * | 5/1902 | Poschmann | 16/87.4 R |
| 1,060,426 | A | * | 4/1913 | Carlson | 16/87.4 R |
| 2,787,435 | A | * | 4/1957 | Pan | 248/307 |
| 3,193,229 | A | * | 7/1965 | Stock | 248/74.2 |
| 3,378,879 | A | * | 4/1968 | Stall | 16/87.4 R |
| 3,737,943 | A | * | 6/1973 | Store | 16/87.2 |
| 3,820,191 | A | * | 6/1974 | Gay | 16/87.2 |
| 4,153,097 | A | * | 5/1979 | Pettibone | 160/330 |
| 5,429,330 | A | * | 7/1995 | Bond et al. | 248/61 |
| 5,547,156 | A | * | 8/1996 | Djuric | 248/307 |
| 5,555,603 | A | * | 9/1996 | Chester | 16/87.2 |
| 5,921,511 | A | * | 7/1999 | LaPointe | 248/73 |
| 6,027,091 | A | * | 2/2000 | Johnson | 248/340 |

* cited by examiner

Primary Examiner—Leslie A. Braun
Assistant Examiner—Kofi Schulterbrandt
(74) Attorney, Agent, or Firm—The Halvorson Law Firm

(57) ABSTRACT

Disclosed is a clip useful for the moveably attaching items to a track system. The clip according to the present invention has a slideable body with an attached light item securing portion. The slidable body is preferably semi-spherical in shape with two opposed, cut-out sections. There is a downward portion that projects from the apex of the semi-spherical shape and attaches to the item securing portion, which includes a shoulder element that prevents unwanted inward movement of the clip relative to the interior of the track system. In one embodiment the item securing portion is first and second depending legs.

4 Claims, 4 Drawing Sheets

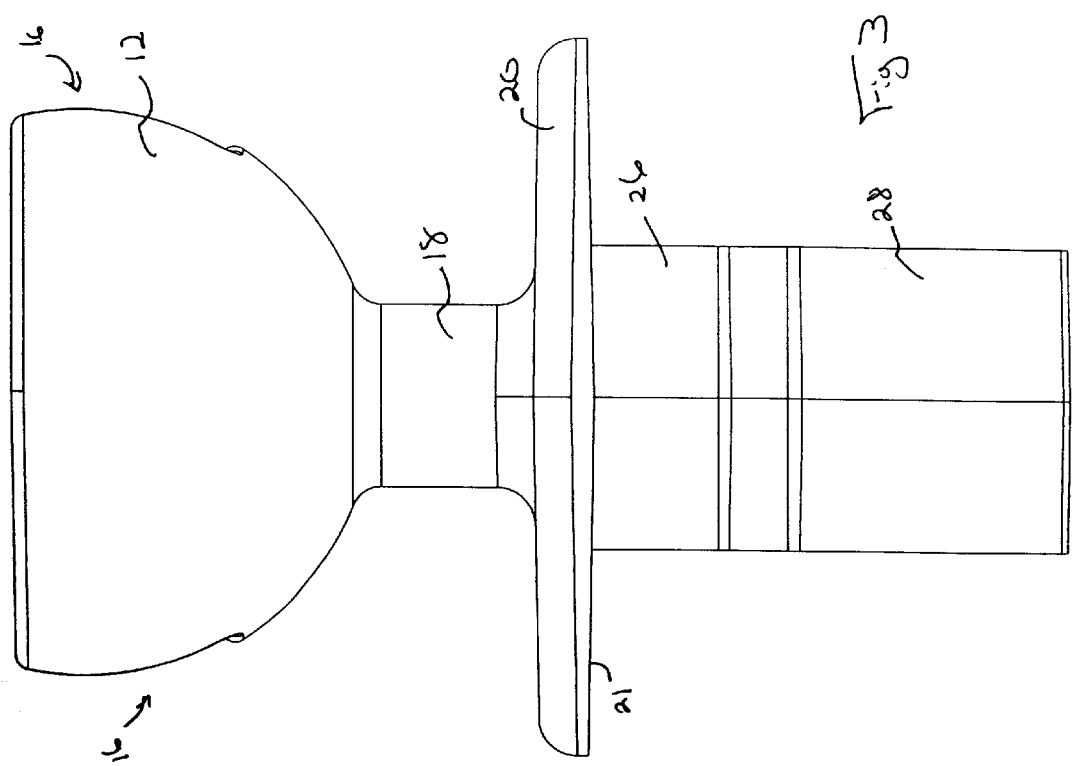

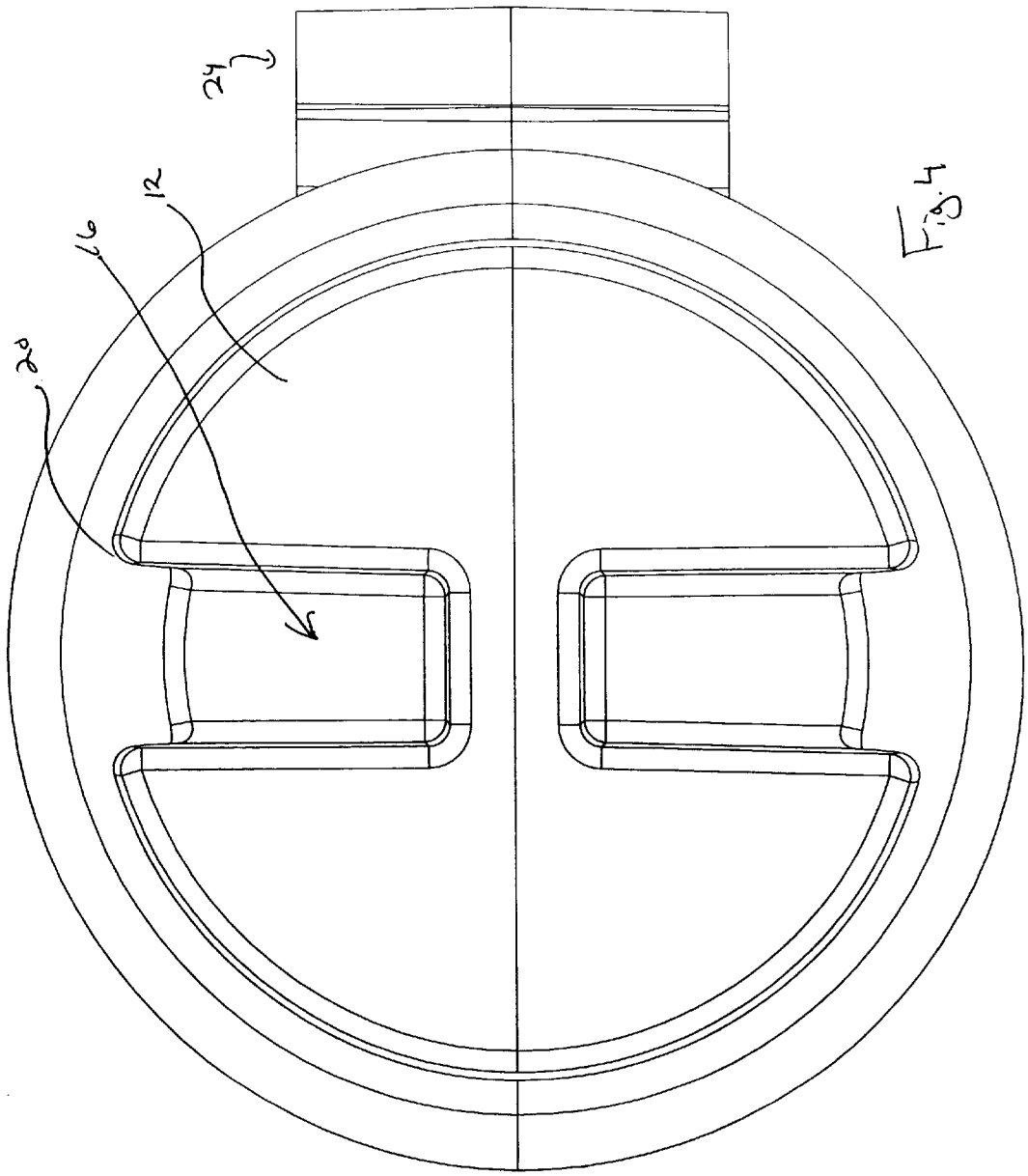

CLIP FOR TRACK SYSTEMS

FIELD OF THE INVENTION

The present invention relates to the field of clip devices designed for use with track system. More specifically the present invention relates to the field of clip devices that movably secure light strings and are used with track systems.

BACKGROUND

It has become common practice to decorate homes, businesses, or other buildings during holiday seasons, such as Christmas, Halloween, Easter, and the like, by attaching strings of lights to achieve a decorative effect. The strings of lights are typically secured beneath: overhanging eaves and around gables, and are also positioned to outline architectural features, whether interior or exterior, of the homes and businesses, such as windows, doorways, bars, and the like.

The strings of lights are usually secured in place by simple connectors such as staples, hooks, nails and the like. This method however, due to repetitive installation and removal of the staples, results in considerable marring of the wooden mounting surfaces and also can be dangerous because of potential damage to light string wires. Staples and other sharp objects are not a recommended method of installation but lacking other convenient methods of light string installation are used by many.

Longs strings of lights, as are typically used, are difficult to install and consequently a householder is often inclined to leave the lights in place once they are secured. Although this avoids yearly installation and removal, the strings of lights are exposed to weather for the full year resulting in their early deterioration and, furthermore, they add nothing to, and in fact detract from, the appearance of a house between holiday seasons. Further, the permanently attached light strings may conveniently express only a single holiday.

Light holders have heretofore been devised for attachment to buildings for attaching strings of lights in a regular manner and which afford the light strings some protection from the weather. These light holders required periodic use of a ladder while installing and removing the holiday light strings. Alternately, if the lights are left in place, they are continuously exposed to view. Consequently, unless the homeowner is content to accept the detraction from the aesthetic qualities of this home, the holders must be installed and removed each holiday season, such as Christmas, Halloween, and the like.

SUMMARY OF THE INVENTION

It is an object of the present invention to provide a clip device for movably securing items to a track system.

The novel features that are considered characteristic of the invention are set forth with particularity in the appended claims. The invention itself, however, both as to its structure and its operation together with the additional objects and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase.

Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition include any and all structures, materials or acts that perform the claimed function, along with any and all known or later-developed equivalent structures, materials or acts for performing the claimed function.

DESCRIPTION OF THE DRAWINGS

FIG. 3 is a second side view (rotated 90° relative to the view in FIG. 2) of the device according to the present invention.

FIG. 4 is a top view of the device according to the present invention.

DESCRIPTION OF PREFERRED EMBODIMENTS

Figure 1:
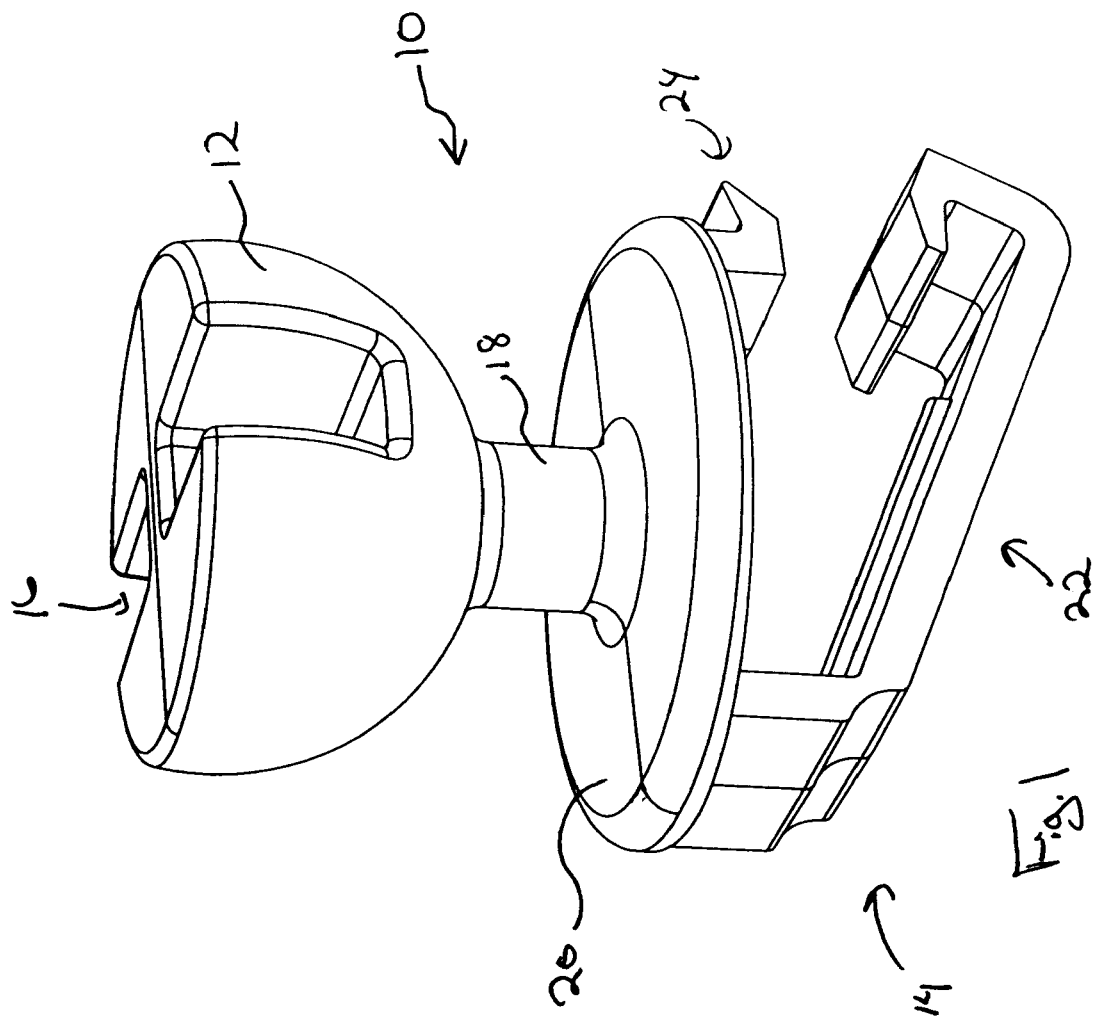
FIG. 1 is a perspective view of the device according to the present invention.
Figure 2:
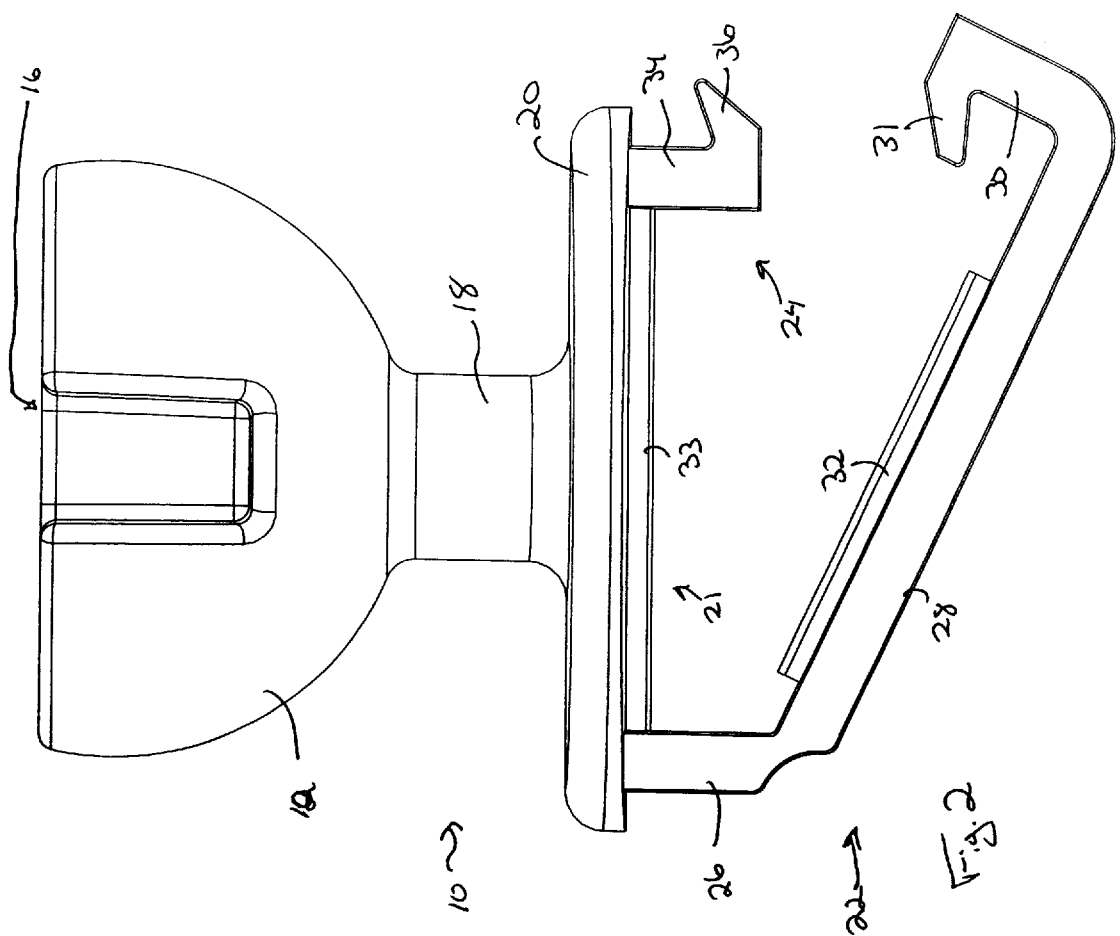
FIG. 2 is a side view of the device according to the present invention.

Referring now to the figures, the present invention is a clip 10 useful for the moveably attaching items to a track system. the clip 10 according to the present invention has a slideable body 12 with an attached light item securing portion 14. The slidable body 12 is preferably semi-spherical in shape with two opposed, cut-out sections 16. There is a downward portion 18 that projects from the apex of the semi-spherical shape and attaches to the item securing portion 14, which includes a shoulder element 20 that prevents unwanted inward movement of the clip 10 relative to the interior of the track system. In one embodiment the item securing portion 14 is first and second depending legs 22 and 24, respectively.

The first depending leg 22 has a first portion 26 that is angularly attached to a second portion 28. The angular attachment is preferably integral in construction and is most preferably formed as a "living hinge", which is common in the plastics injection molding industry. There is a third portion 30 that is attached to a distal end of the second portion 28 and forms a substantially L-shape. Attached to a distal end of the third portion 30 is a first barb 31 that is directed toward the first portion 26 and is substantially parallel to the second portion 28. The attachment of the third portion 30 to the second portion 28 is also preferably integral in construction, but should not be of a "living hinge" type. Attached along the length of the second portion 28 there may be a first securing tab 32 that functions to anchor a secured item between the second portion 28 and a second securing tab 33 located on a bottom side 21 of the shoulder element 20.

The second depending leg 24 is short in comparison the first depending leg 22 and only has a single segment 34 with an outwardly attached second barb 36.

It should be noted that the semi-spherical shape of the slidable body 12, working with the downward portion 18, allows the clips 10 to be pivoted into anyone of numerous positions. This feature allows the track system to be mounted on angled substrates while allowing the attached items to be aligned in a non-angled (or alternate angled) fashion.

Additionally, the downward portion 18 that projects from the apex of the slidable body 12 of the clip 10 may include an articulated joint (not shown). The articulated joint is used to provide additional flexibility in the positioning of mounted light strings.

In use a portion of an item to be movably attached to the track system is placed between the bottom side 21 of the shoulder element 20 and the second portion 28 of the first depending leg 22. The first depending leg 22 is then forced toward the second depending leg 24 until the first barb 31 securely, but removably, engages the second barb 36. Pressure created by engaging the first barb 31 with the second barb 36 secures the item to the clip. Insertion of the slidably body 12 into the track system may be done either before or after the item is secured to the clip.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A clip for removably mounting an item to a track system comprising a semispherical slidable body, a downward portion that projects from the apex of the semispherical shape, a shoulder element attached to the downward portion and first and second depending legs attached to the shoulder element, said slideable body sized to movably fit within a track system, wherein the first depending leg comprises a first portion that is angularly attached to a second portion, a third portion that is attached to a distal end of the second portion and forms a substantially L-shape relative to the second portion, and a first barb attached to a distal end of the third portion, which is directed toward the first portion and is substantially parallel to the second portion and further comprises a first securing tab that extends along the length of the second portion of the first depending leg and a second secure tab located on a bottom side of the shoulder element.

2. The clip according to claim 1 wherein the second depending leg comprises a single segment with an outwardly attached second barb.

3. The clip according to claim 1 wherein the attachment point between the first portion and the second portion is a living hinge.

4. The clip according to claim 2 wherein the attachment point between the first portion and the second portion is a living hinge.

* * * * *